US012071891B1

(12) United States Patent
Coots et al.

(10) Patent No.: US 12,071,891 B1
(45) Date of Patent: Aug. 27, 2024

(54) ELECTRICAL POWER GENERATION USING COMPRESSED GAS

(71) Applicant: ADG POWER, LLC, Batson, TX (US)

(72) Inventors: Joshua Wayne Coots, Beaumont, TX (US); James Francis Warren, Siletz, OR (US)

(73) Assignee: ADG POWER, LLC, Batson, TX (US)

( * ) Notice: Subject to any disclaimer, the term of this patent is extended or adjusted under 35 U.S.C. 154(b) by 135 days.

(21) Appl. No.: 17/899,326

(22) Filed: Aug. 30, 2022

Related U.S. Application Data

(60) Provisional application No. 63/260,711, filed on Aug. 30, 2021.

(51) Int. Cl.
*F02C 6/00* (2006.01)
*F02C 1/02* (2006.01)
(Continued)

(52) U.S. Cl.
CPC .................. *F02C 6/00* (2013.01); *F02C 1/02* (2013.01); *F02C 6/14* (2013.01); *F02C 6/16* (2013.01); *F02C 7/32* (2013.01); *F03B 1/02* (2013.01); *F03B 7/003* (2013.01); *F03B 11/06* (2013.01); *F03B 13/06* (2013.01); *F03B 15/16* (2013.01); *F03B 17/00* (2013.01); *F03B 17/005* (2013.01); *H02K 7/14* (2013.01); *H02K 7/18* (2013.01); *H02K 7/1823* (2013.01); *H02K 7/183* (2013.01); *H02K 21/14* (2013.01); *H02K 21/24* (2013.01);
(Continued)

(58) Field of Classification Search
CPC ...... F02C 6/00; F02C 6/14; F02C 6/16; F02C 1/02; F02C 7/32; H02K 7/1823; H02K 7/14; H02K 7/183; H02K 7/18; H02K 21/24; H02K 21/14; F02B 17/00; F02B 17/005; F02B 13/06; F02B 11/06; F02B 15/16; F02B 7/003; F02B 1/02; H02P 9/04; H02P 2101/10; F05B 2260/504; Y02E 10/20
See application file for complete search history.

(56) References Cited

U.S. PATENT DOCUMENTS 3,360,926 A * 1/1968 Parr ........................ F03B 17/02
415/7
4,260,902 A * 4/1981 Crider ................... F03B 17/063
290/43

(Continued)

*Primary Examiner* — Dapinder Singh
(74) *Attorney, Agent, or Firm* — ROY KIESEL FORD DOODY & NORTH, APLC

(57) ABSTRACT

A buoyancy powered electrical generator. A source of compressed gas is provided. The gas, which may be air, is compressed using a conventional compressor. In one embodiment, the compressor is powered by a windmill, turbine, or other conventional means. The compressed gas may be stored in a tank for an indefinite period. If necessary, the tank may be transported to the generator via truck, train or other conventional transportation means. During generation, compressed gas is released into a series of hollow, flooded drums mounted on a wheel in a liquid filled chamber. Introducing gas into the drums closes a valve in the drums and evacuates liquid from the drums, causing the drums to become buoyant. The buoyant drums exert a buoyant force on the wheel, causing it to rotate. The wheel is connected to a rotor in a magnetic generator. Rotating the wheel turns the rotor, thereby generating electricity.

31 Claims, 10 Drawing Sheets

(51) Int. Cl.
*F02C 6/14* (2006.01)
*F02C 6/16* (2006.01)
*F02C 7/32* (2006.01)
*F03B 1/02* (2006.01)
*F03B 7/00* (2006.01)
*F03B 11/06* (2006.01)
*F03B 13/06* (2006.01)
*F03B 15/16* (2006.01)
*F03B 17/00* (2006.01)
*H02K 7/14* (2006.01)
*H02K 7/18* (2006.01)
*H02K 21/14* (2006.01)
*H02K 21/24* (2006.01)
*H02P 9/04* (2006.01)
*H02P 101/10* (2015.01)

(52) U.S. Cl.
CPC .......... *H02P 9/04* (2013.01); *F05B 2260/504* (2013.01); *H02P 2101/10* (2015.01); *Y02E 10/20* (2013.01)

(56) References Cited

U.S. PATENT DOCUMENTS

| | | | | |
|---|---|---|---|---|
| 4,385,497 | A * | 5/1983 | Scott | F03B 7/003 416/101 |
| 6,764,275 | B1 * | 7/2004 | Carr | F03B 17/005 60/639 |
| 8,044,530 | B2 * | 10/2011 | Harris | F03B 17/04 290/43 |
| 8,453,442 | B1 * | 6/2013 | Tran | F03B 17/02 60/495 |
| 9,890,761 | B2 * | 2/2018 | Kasten | F03B 17/00 |
| 11,162,470 | B2 * | 11/2021 | Hansmann | F03B 17/04 |

* cited by examiner

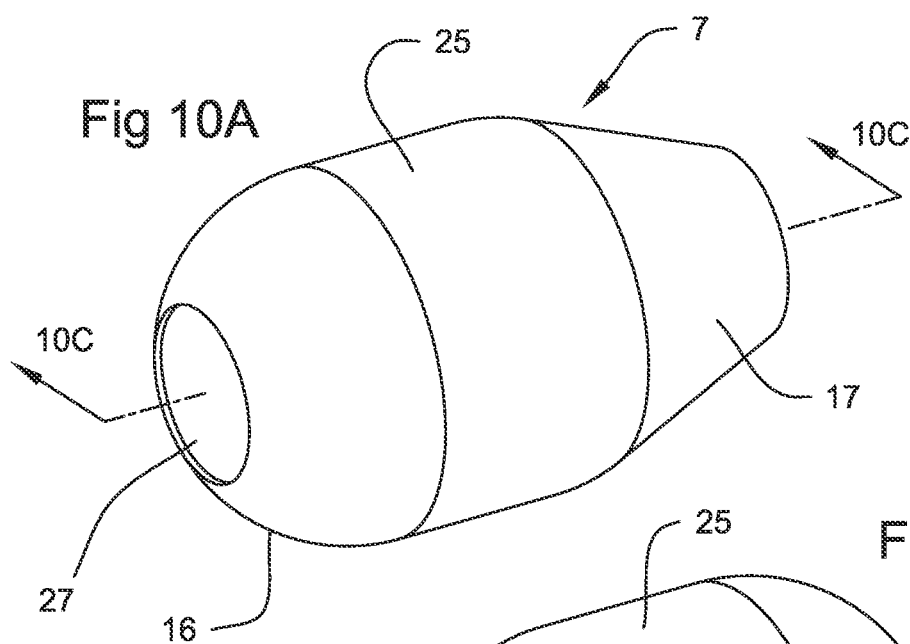
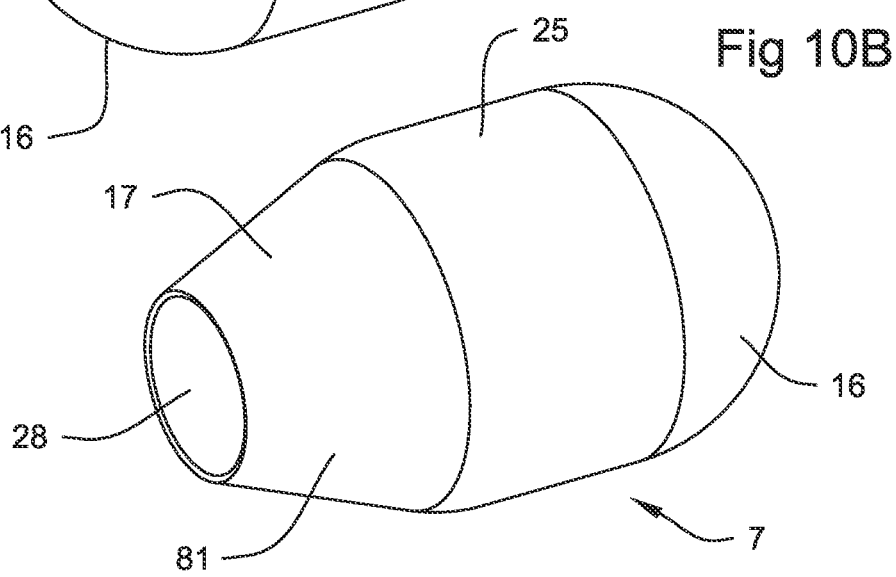
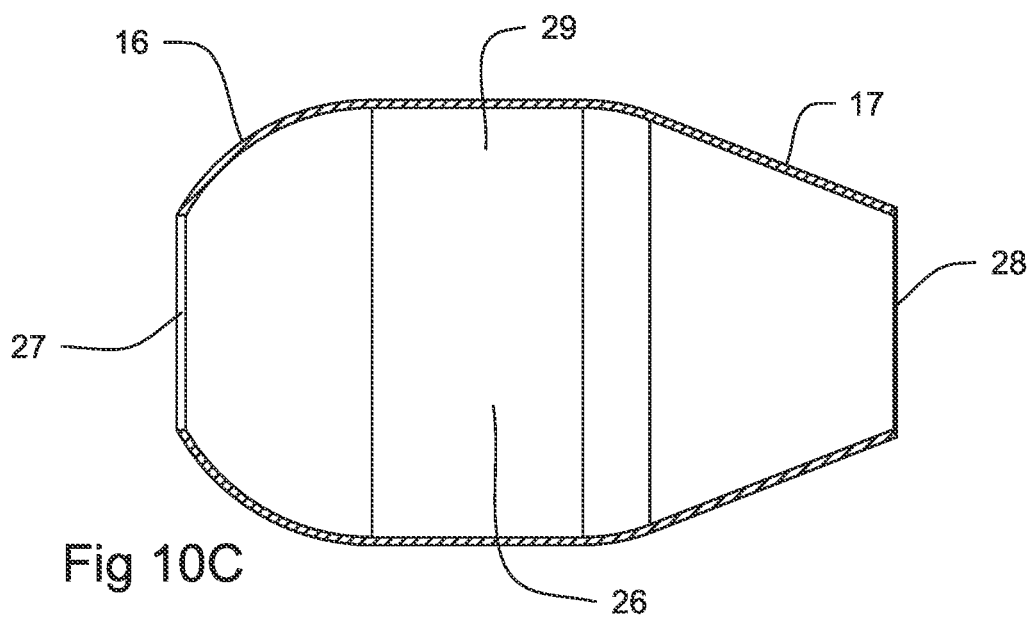

ELECTRICAL POWER GENERATION USING COMPRESSED GAS

CROSS REFERENCE TO PRIOR APPLICATION

This application claims benefit to and is a continuation-in-part of U.S. Provisional Application Ser. No. 63/260,711, filed on Aug. 30, 2021, which is hereby incorporated by reference in its entirety.

BACKGROUND OF THE INVENTION

Field of the Invention

This invention relates to clean energy generation and storage in general and to the generation and storage of energy from compressed gas, in particular.

Prior Art

The generation of clean energy from a variety of sources is known. One example of clean energy generation involves the use of windmills. These are often large scale, industrial devices. They frequently have a significant footprint. As a result, obtaining the land necessary to host such devices often requires the windmills to be located in rural areas, often significant distances from urban areas. Thus, to use windmills to generate power, high tension power lines must often be run from the windmill to a location where the power is needed. This can involve obtaining rights-of-way and building power lines across great distances, at substantial expense and sometimes at significant environmental cost. Similar concerns apply to offshore windmills. Similar issues apply to hydroelectric plants, whether traditional dams or other technologies, such as floating or submerged turbines utilizing river or ocean currents.

Another problem with wind driven and many ocean current generated power sources is the inconsistency of the power source. The wind does not blow all the time. When it is blowing, sometimes the wind blows too weakly to generate much power. Sometimes the wind blows so strongly that damage to the windmills is a risk, such that power generation must be discontinued. Likewise, with ocean currents. Tides change, such that the strength of ocean currents vary. Moreover, the strength of the wind and the air and water currents often fail to match up with times of peak electrical demand, such that getting electricity from wind and current driven power systems when it is needed can be problematic.

Another inefficiency in the energy industry is natural gas. Petroleum wells commonly produce three products: salt water; crude oil; and natural gas. Sometimes the gas is captured and marketed. However, frequently the gas is burned on site. Many wells, especially older wells, lack the equipment necessary to collect the gas produced. Historically, the gas was worth much less than the crude oil, and the wells were not installed with the equipment needed to capture the gas in a marketable form. While the value of natural gas has increased significantly, it may not justify retrofitting older wells. In other wells, the gas constitutes a small fraction of the well production compared to the crude oil, such that collecting the gas is difficult to justify commercially. In any event, the gas is under pressure from the down-hole formation, and its release into the atmosphere whether via combustion or not, constitutes a loss of energy that could have been produced by the well.

Accordingly, a power generation and storage device meeting the following objectives is desired.

OBJECTS OF THE INVENTION

It is an object of the invention to generate electricity from compressed gas.

It is another object of the invention to provide a battery for generation of electricity upon demand.

It is another object of the invention to provide a system for transporting power from a place of production to a place where the power is needed without building transmission lines.

It is yet another object of the invention to provide a system for transporting power from a place of production to a place where transmission lines already exist.

It is still another object of the invention to provide a system for generating power at one time and storing it until a later time.

It is yet another object of the invention to capture energy that is being lost in current power generation systems.

It is still another object of the invention to capture energy that is being lost in current industrial systems.

It is yet another object of the invention to increase the efficiency of current power generation systems.

It is still another objection of the invention to increase the efficiency of current industrial systems.

SUMMARY OF THE INVENTION

The invention comprises a compressed gas battery or other source of compressed gas and a buoyancy driven generator. In the windmill application, instead of using the windmills to generate electricity, the windmills may be used to run a compressor to generate one or more tanks of compressed air. These may be used on site or transported by truck, barge, or (ideally) train to a power generation station. Once at the desired location, the tanks may be stored almost indefinitely until power generation is desired.

When power generation is desired, the compressed gas may be released to drive a buoyancy driven generator. The generator comprises a chamber configured to hold a liquid, preferably water. A wheel, with a plurality of drums on the periphery of the wheel, is positioned in the chamber. A gas distribution system is connected to and preferably disposed within the wheel. When a tank or other source of compressed gas is connected to the gas distribution system, compressed gas may be delivered selectively to the drums. When the wheel is rotating, it will have a rising side and a falling side. By delivering the compressed gas to the drums only on the rising side of the wheel, and below the level of the liquid in the chamber, the buoyant forces generated by filling the drums with compressed gas below the surface of the liquid will drive the rotation of the wheel. Allowing the drums to fill with liquid on the falling side of the wheel will facilitate rotation of the wheel.

The wheel is preferably connected to a generator having a stator and a rotor. By effecting rotation of the wheel, the rotor may be turned in the generator to produce electricity.

BRIEF DESCRIPTION OF THE DRAWINGS

FIG. 10A is a front perspective view of an embodiment of a drum.

FIG. 10B is a rear perspective view of an embodiment of a drum.

FIG. 10C is a cut-away elevation view of the drum of FIG. 10A taken along line 10C-10C.

DETAILED DESCRIPTION OF THE BEST MODE

Figure 1:
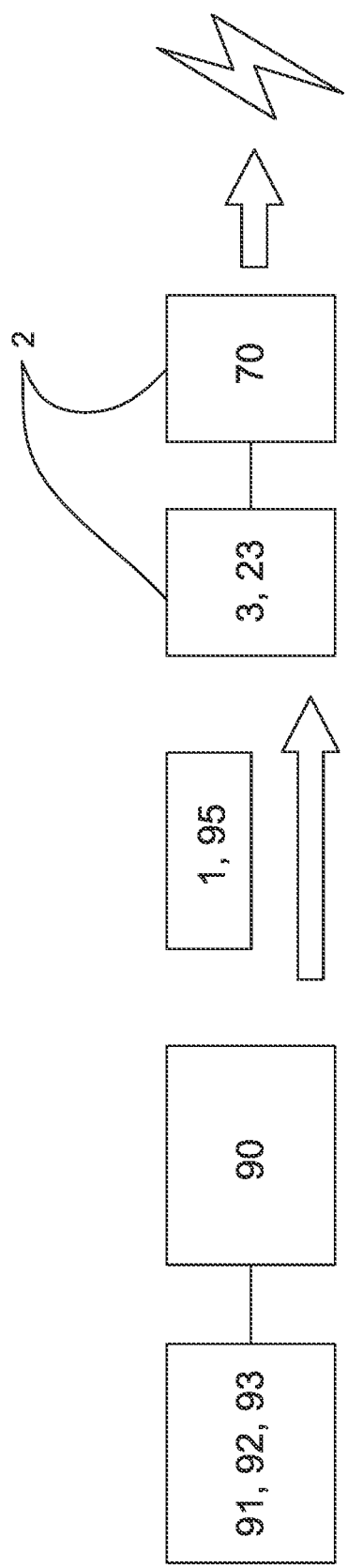
FIG. 1 is a schematic overview of the invention.
Figure 2:
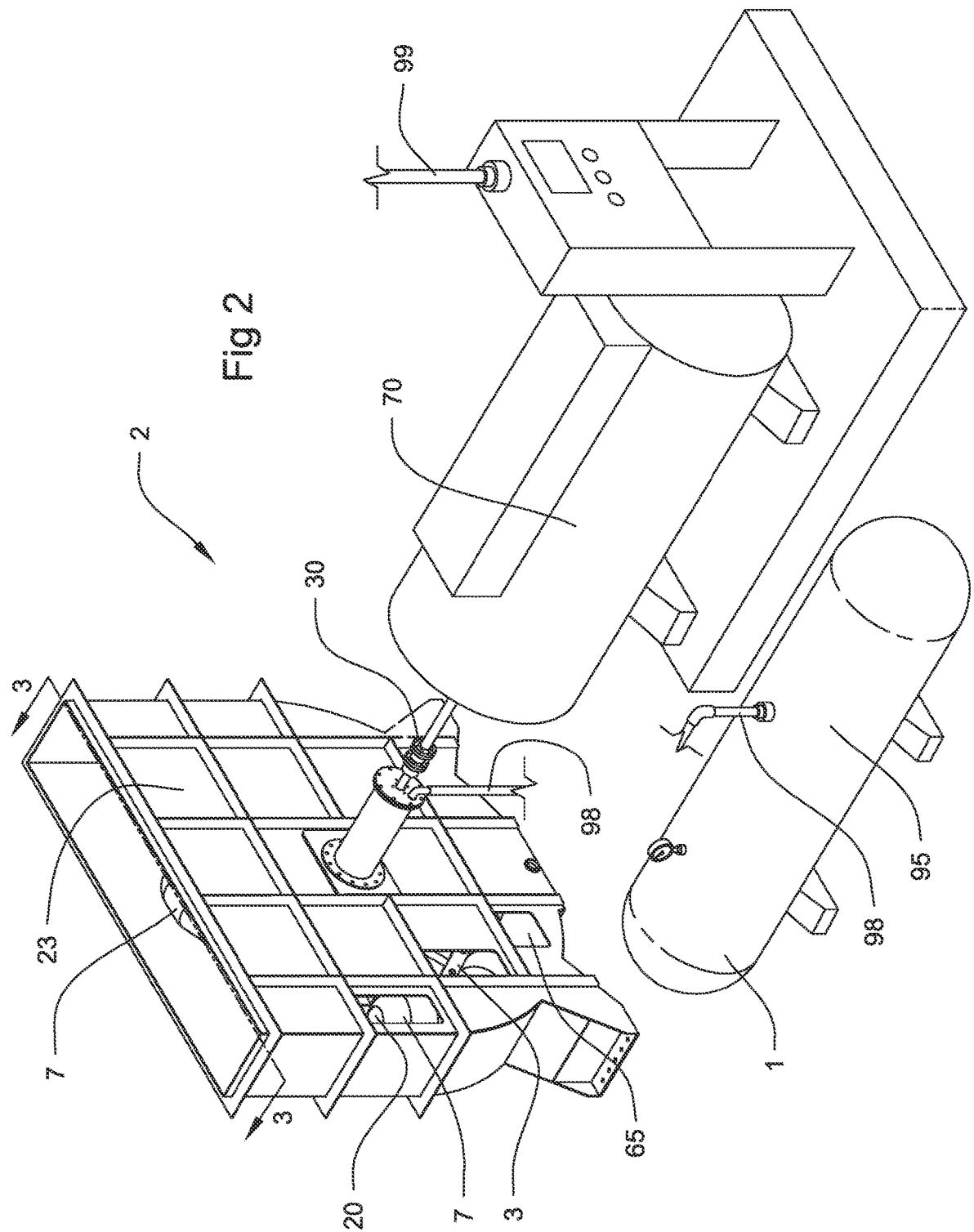
FIG. 2 is a perspective view of one embodiment of the invention.
Figure 3:
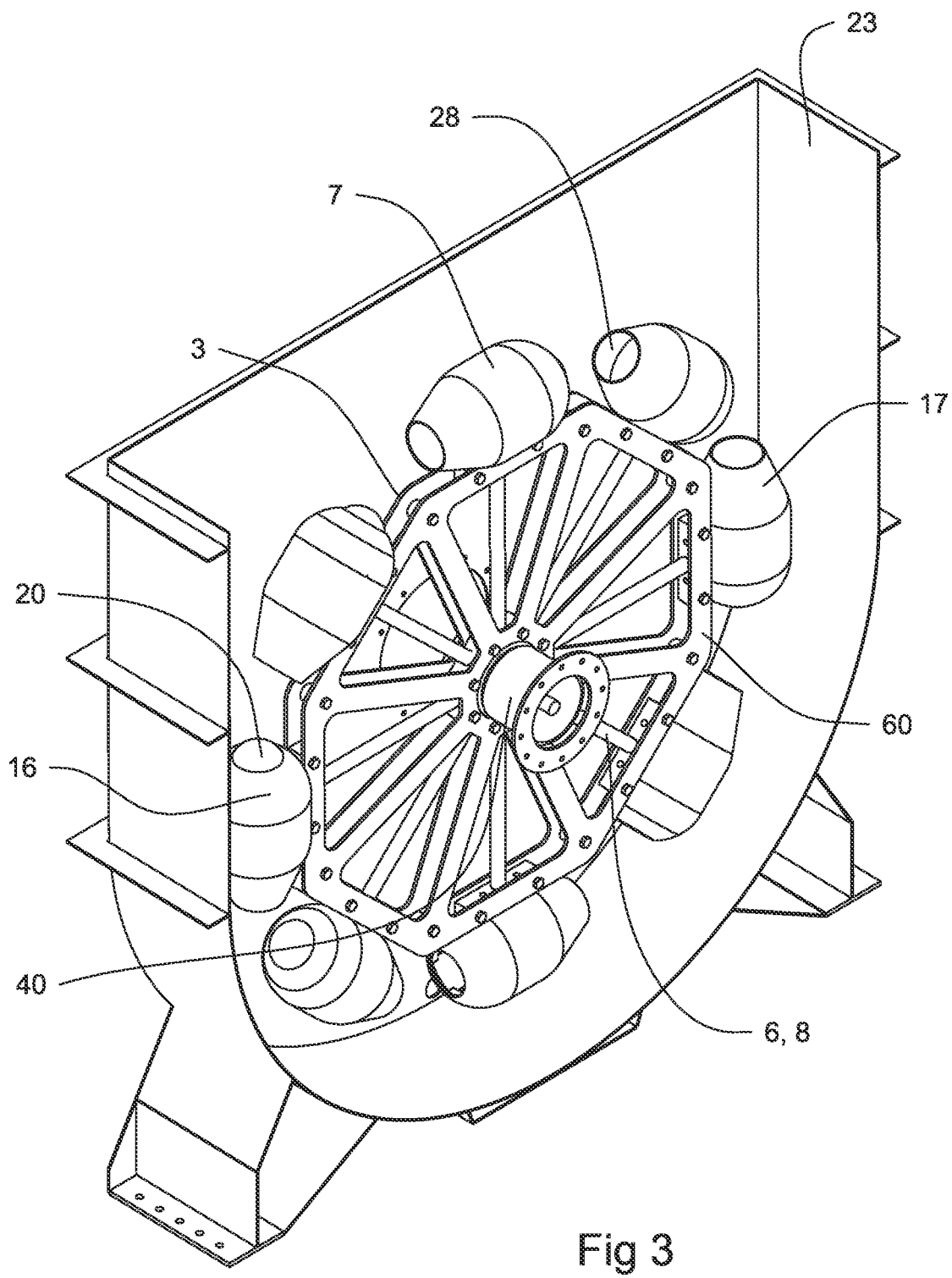
FIG. 3 is a front perspective, partial cut-away view of the embodiment of a chamber containing a wheel wherein the chamber of FIG. 2 is cut along line 3-3.
Figure 4:
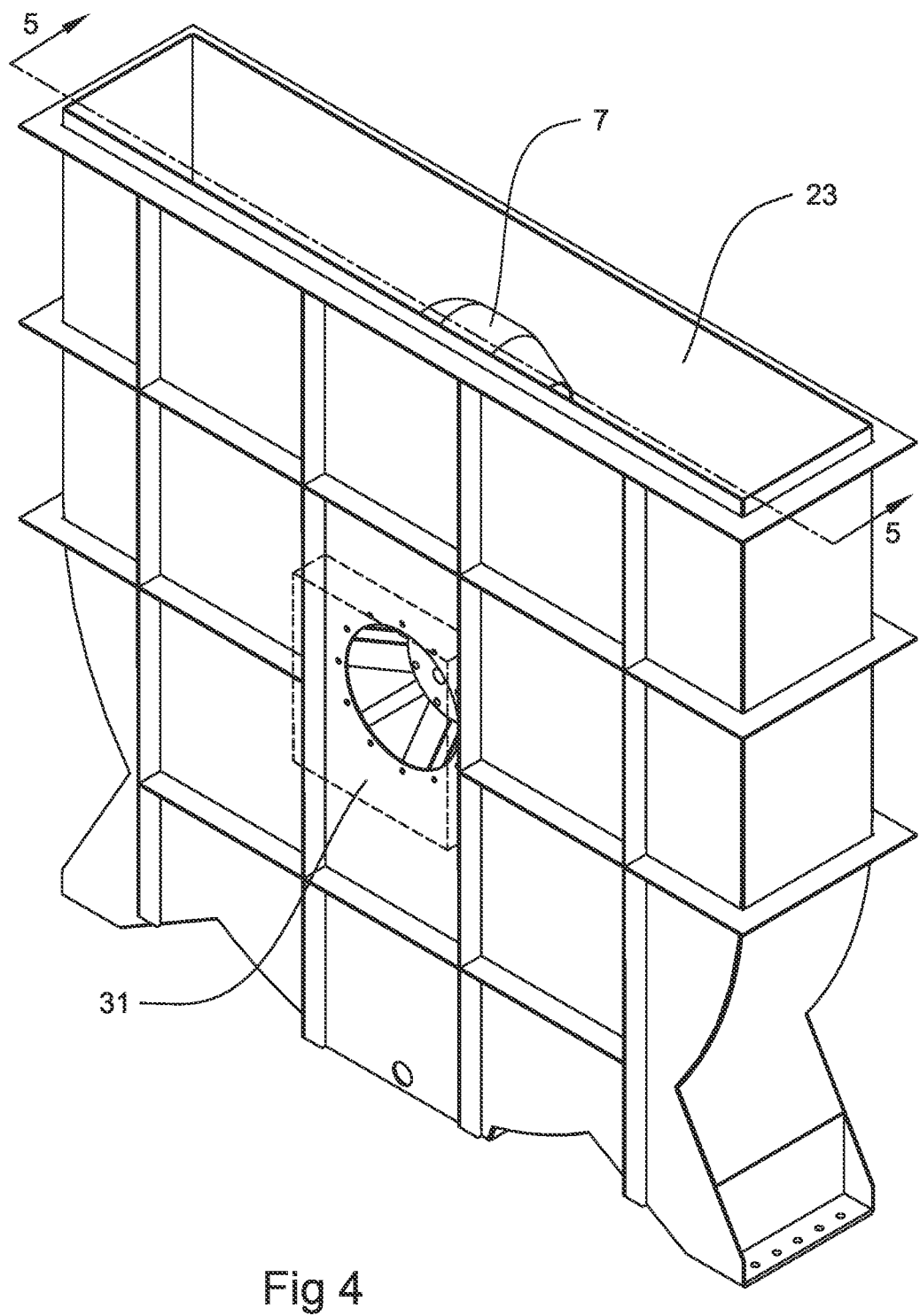
FIG. 4 is a rear perspective view of an embodiment of a chamber containing a wheel.
Figure 5:
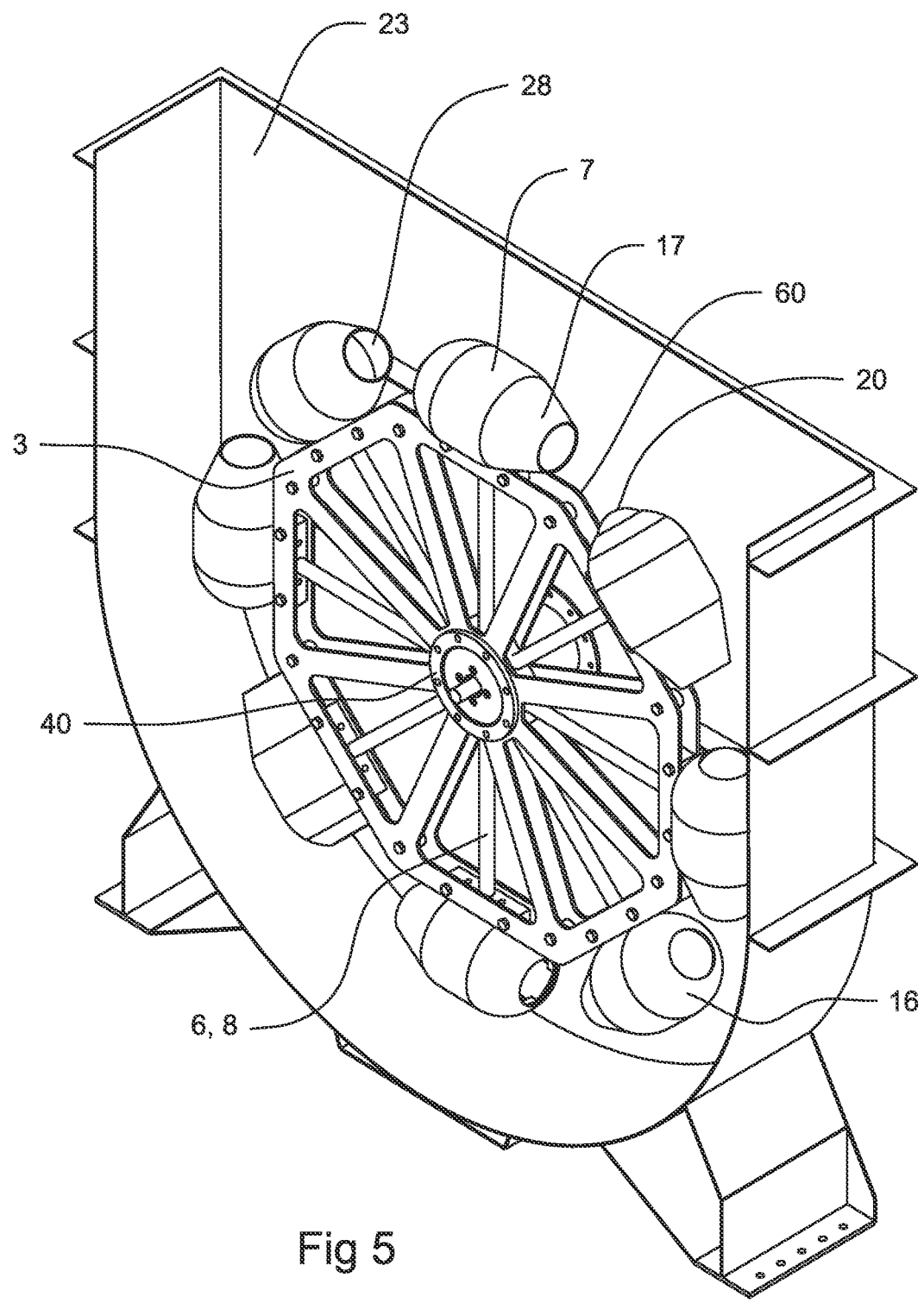
FIG. 5 is a rear perspective, partial cut-away view of the embodiment of a chamber containing a wheel of FIG. 4 cut along line 5-5.
Figure 6:
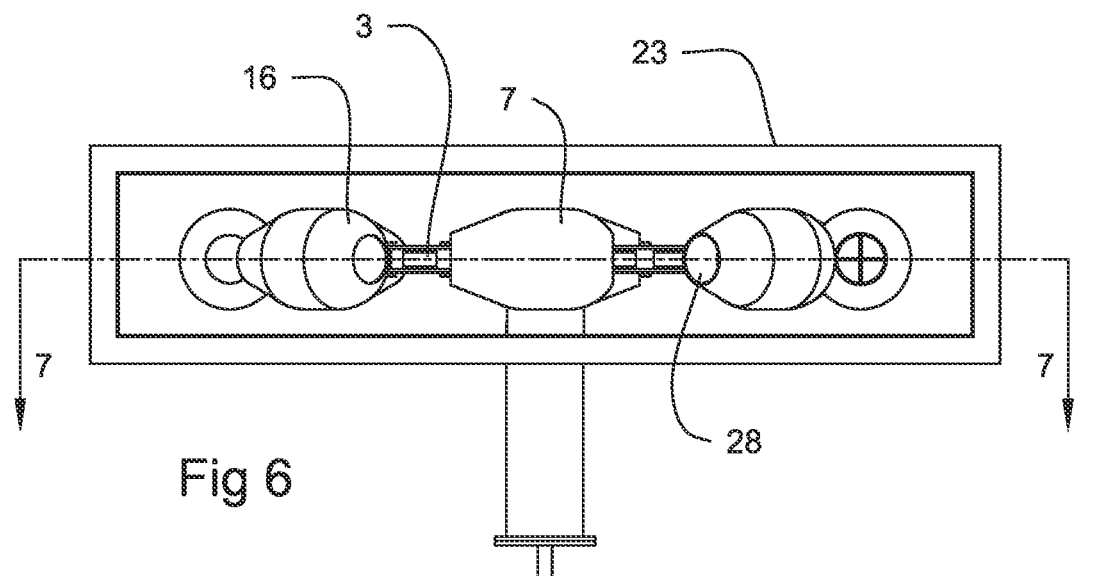
FIG. 6 is a top view of one embodiment of a chamber containing a wheel.
Figure 7:
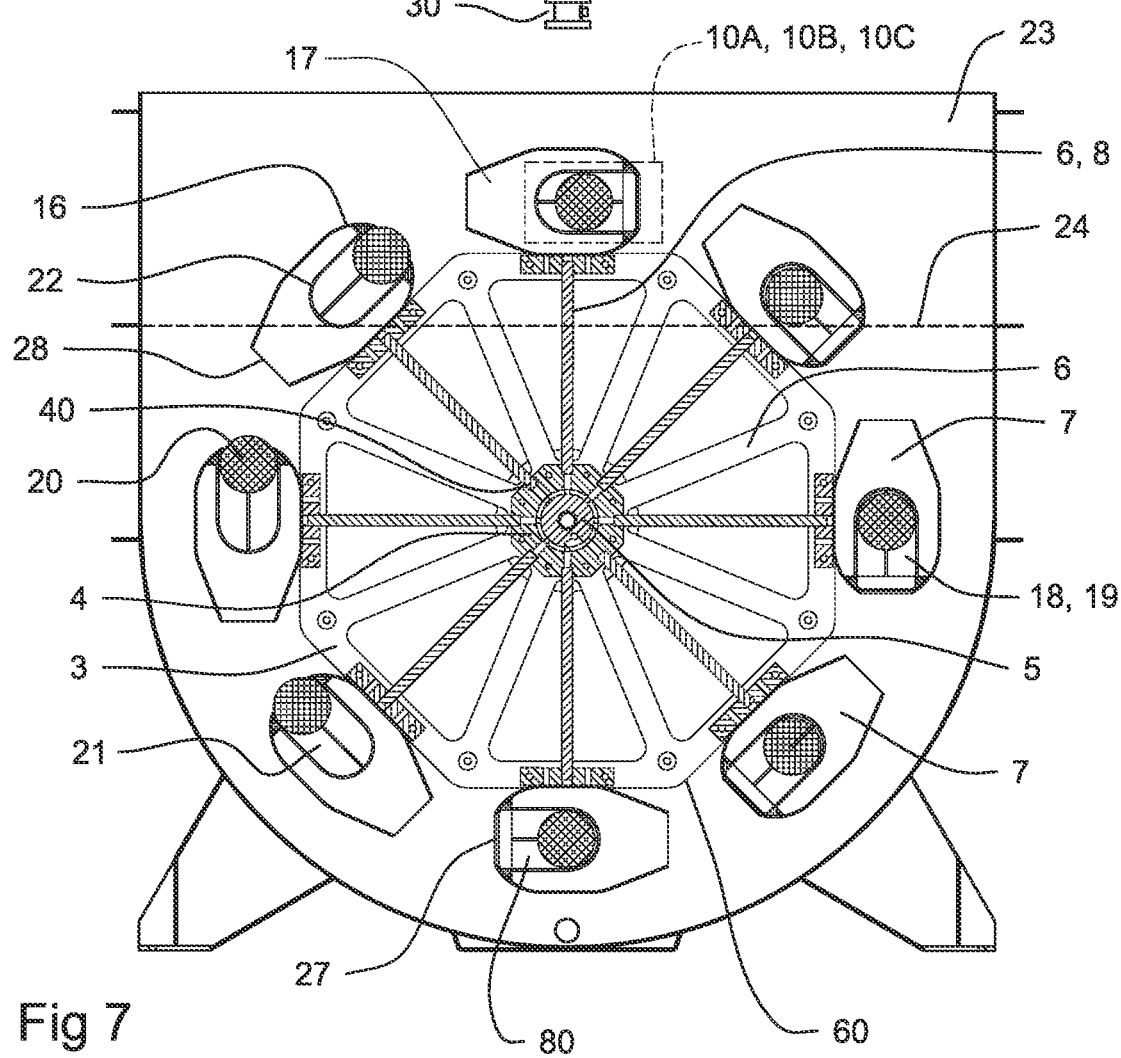
FIG. 7 is a cut-away elevation view of the chamber containing a wheel of FIG. 6 cut-along line 7-7.
Figure 8A:
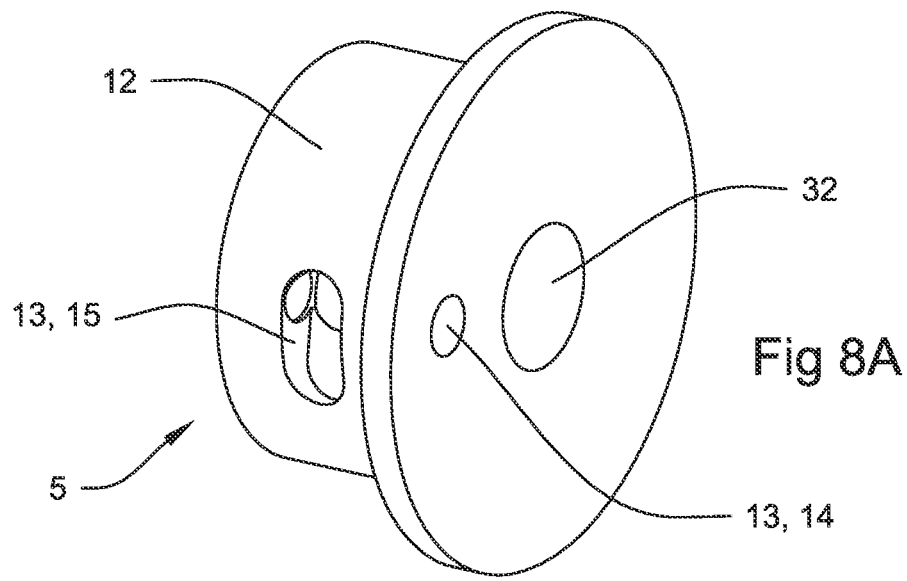
FIG. 8A is a bottom perspective view of an embodiment of an inner hub.
Figure 8B:
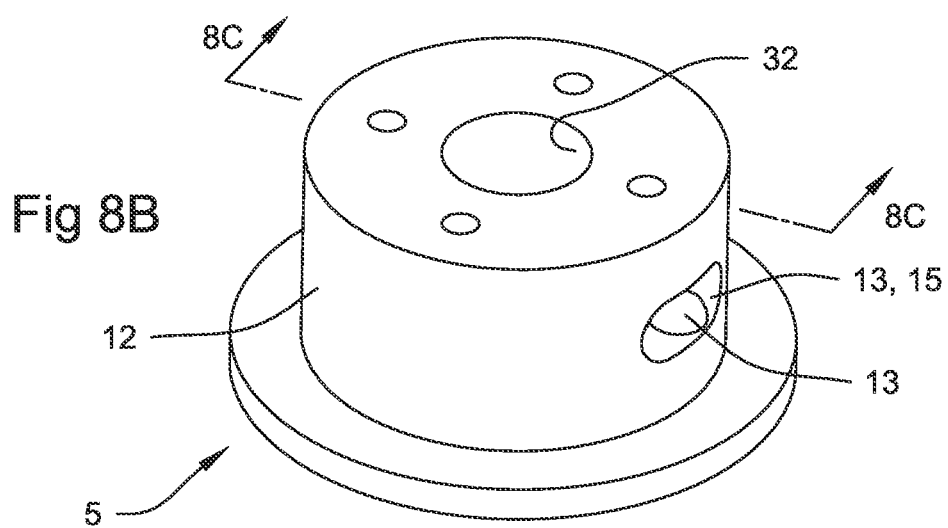
FIG. 8B is a top perspective view of an embodiment of an inner hub.
Figure 8C:
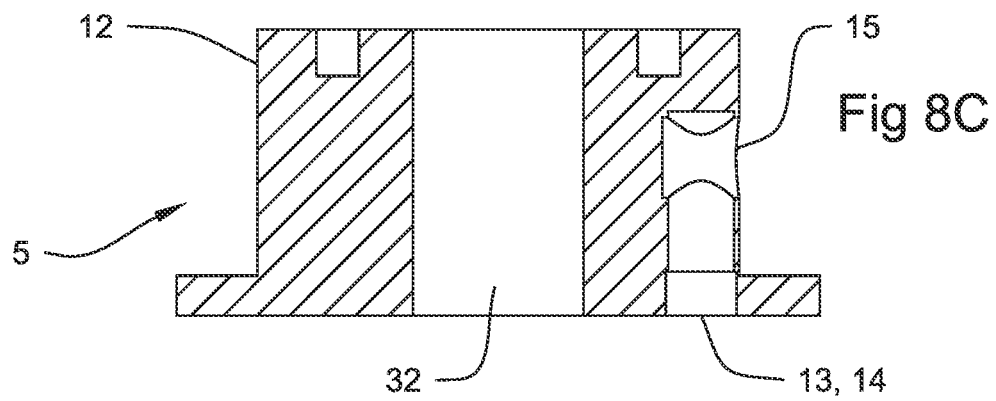
FIG. 8C is a cut-away elevation view of the inner hub of FIG. 8B taken along line 8C-8C.
Figure 9A:
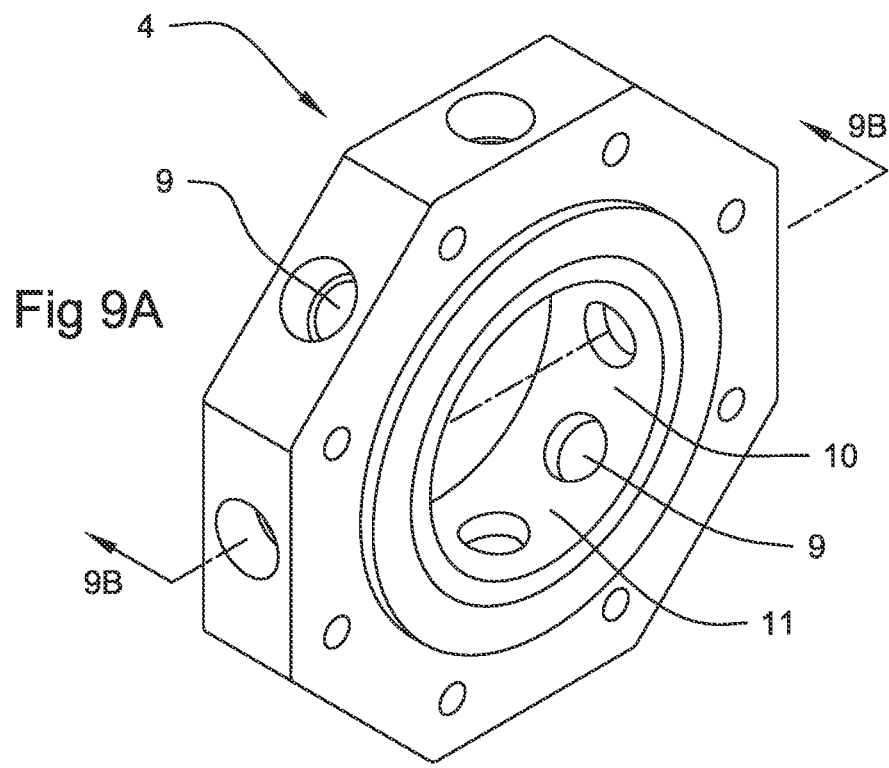
FIG. 9A is a perspective view of an embodiment of an outer hub.
Figure 9B:
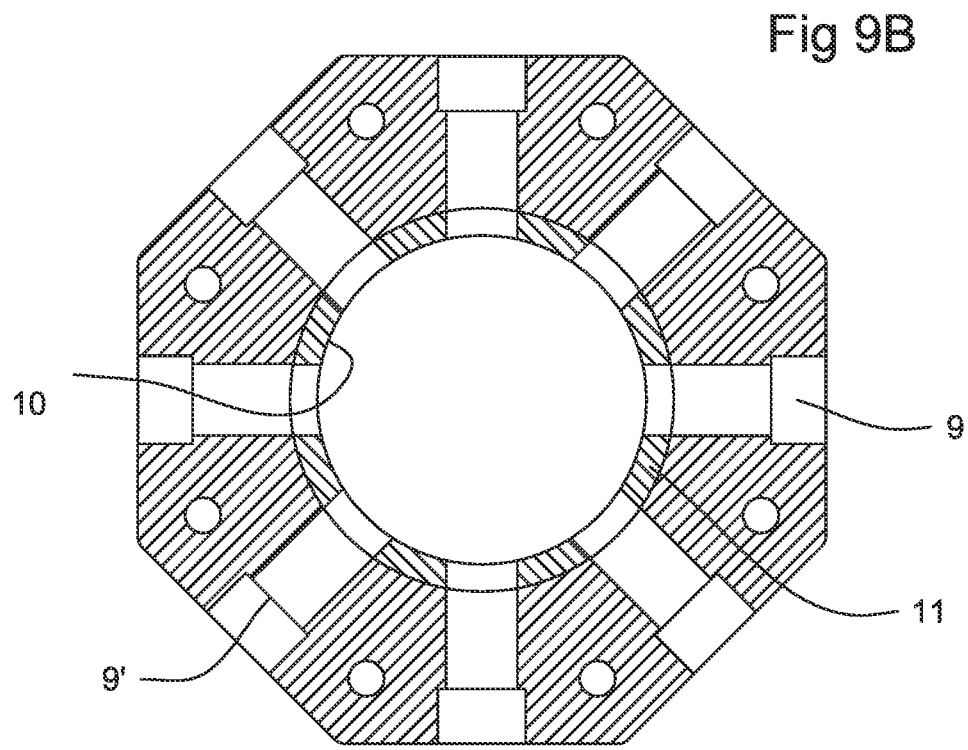
FIG. 9B is a cut-away elevation of the outer hub of FIG. 8A taken along line 9B-9B.
Figure 11A:
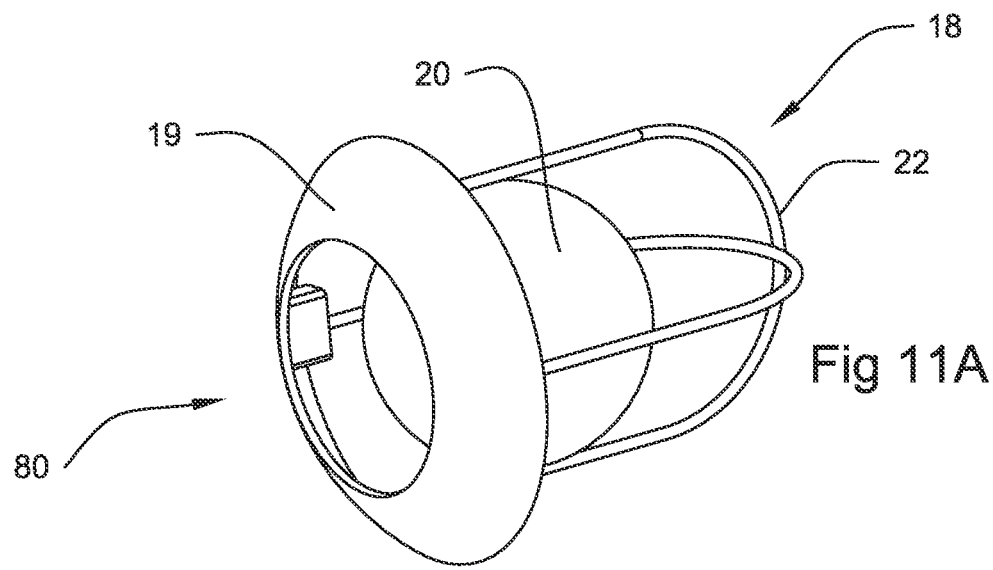
FIG. 11A is a perspective view of an embodiment of a ball valve in a track.
Figure 11B:
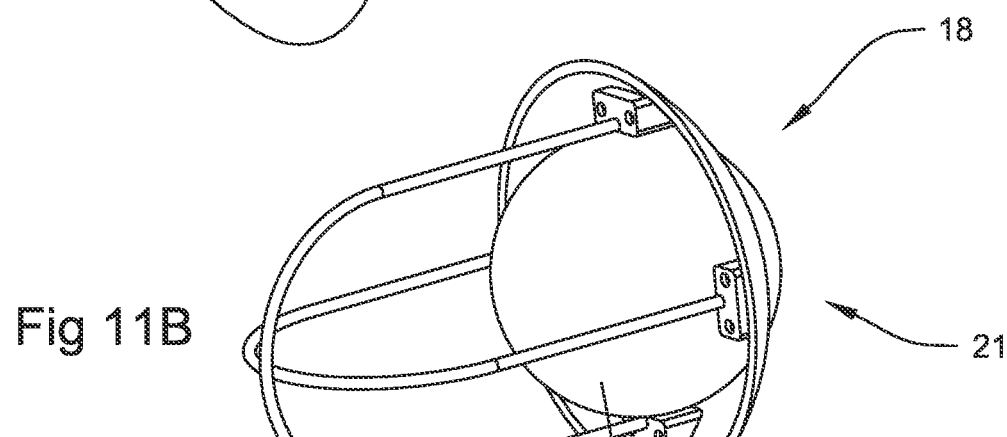
FIG. 11B is a perspective front view of an embodiment of a drum with a ball valve in the closed position.
Figure 11C:
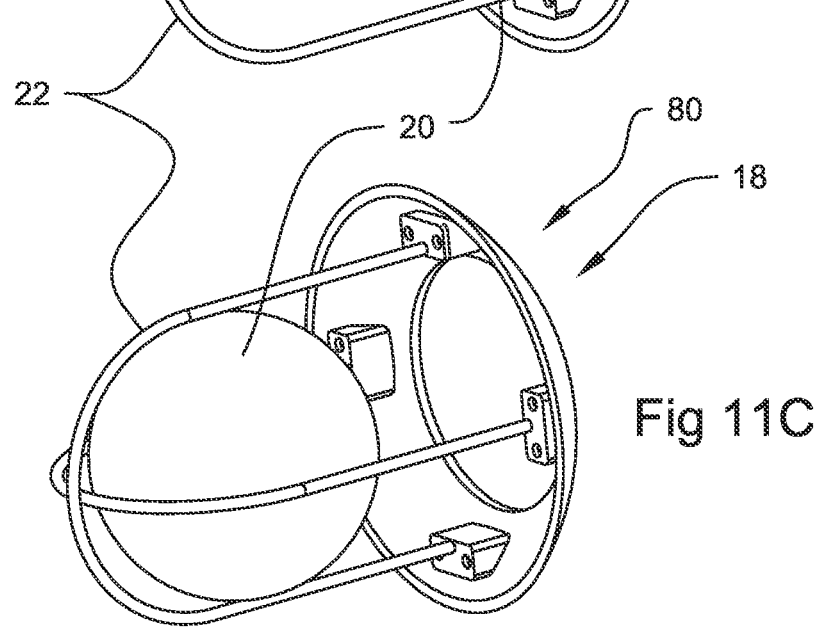
FIG. 11C is a perspective front view of an embodiment of a drum with a ball valve in the open position.

In a preferred embodiment, a source of compressed gas 95 is provided. Source of compressed gas 95 may be a tank 1 is filled with compressed gas. As used herein "compressed" means a pressure greater than atmospheric pressure. In many embodiments, the compressed gas may be compressed air.

The gas may be compressed by a conventional compressor 90 powered by a windmill, 91 turbine 92, or any conventional source of power 93. Tank 1 will commonly be filled to between about 100 and 2000 psi and as high as 6000 to 10000 psi with high strength tanks. Once filled, tank 1 may be stored indefinitely. Where tank 1 is filled with compressed air, there is very little risk to storing tanks 1. Compressed air is not an environmental risk, and it poses a safety risk only in the event of a rupture of tank 1. While an air tank under high pressure may cause physical or property damage in the event of a rupture, it is unlikely to cause an explosion or fire. Compared to almost every other power storage mechanism, compressed air is extremely safe, both for storage and transportation.

Full tank 1 may be transported by any conventional means, such as truck or train. Tanks 1 may be reused for years, and tanks 1 that wear out may be recycled.

Once full, compressed gas tanks 1 may be used to generate electricity at any time. As noted above, a windmill 91, turbine 92, or other power source 93 may be used to run a compressor 90 to fill tank 1. Tank 1 may then be tapped at any time to generate electricity. It will be observed that this may be done at the location where tank 1 is filled, proximate to where tank 1 is filled, or at a location removed from where tank 1 is filled, after transportation, perhaps over many miles.

Once tank 1 is ready to be tapped, the compressed gas tank 1 contains may be used to drive a buoyancy powered generator 2. In the preferred embodiment, generator 2 includes a wheel 3 having hub 40 comprised of an outer hub 4 configured to rotate on a fixed inner hub 5. A plurality of spokes 6 extend from outer hub 4. A plurality of drums 7 are radially disposed about hub 40, preferably along the rim 60 of wheel 3. In a preferred embodiment, a drum 7 is positioned on one of spokes 6, distal from outer hub 4. Multiple drums 7 may be included on each spoke 6, if desired. An air line 8 runs from outer hub 4 to each drum 7. Each air line 8 preferably runs along, and most preferably is contained within, a spoke 6. Air lines 8 and drums 7 are fluidly connected, preferably one air line 8 to each drum 7. A check valve (not shown) may be provided to allow gas to flow from air line 8 into drum 7 but to prevent gas or liquid from flowing from drum 7 into air line 8.

Outer hub 4 includes a plurality of distribution ports 9. Each distribution port 9 is preferably mated to an air line 8, whereby ports 9 provide fluid passage through outer hub 4 to air lines 8 and drums 7.

The interior surface 10 of hub 4 is preferably a suitable bearing surface. This could be achieved by providing a bearing comprising one or more races and rollers (not shown). In a preferred embodiment, a bronze bushing bearing 11 is provided on the interior surface 10 of outer hub 4. Distribution ports 9 extend through bearing 11.

Outer hub 4 is fitted over and turns about inner hub 5. In a preferred embodiment, inner hub 5 is stationary. Inner hub 5 has an outer surface 12 on which bearing 11 of outer hub 4 rests and turns. Inner hub 5 contains an inlet port 13. Inlet port 13 has a tank end 14 that can be fluidly connected to tank 1 or other source of compressed gas. Inlet port 13 also preferably has a mouth 15 that is preferably positioned in outer surface 12 of inner hub 5. In a preferred embodiment, as outer hub 4 turns on inner hub 5, distribution ports 9 will be successively aligned with mouth 15 of inlet port 12, which will successively effect a fluid connection from tank 1 and inlet port 13 through distribution ports 9 and air lines 8 to drums 7.

By appropriately sizing mouth 15 relative to distribution ports 9, the length of time each drum is exposed to the compressed gas in tank 1 may be regulated. For example, in the preferred embodiment, mouth 15 is oval in shape (ignoring its curvature) and about 3 inches long. In the preferred embodiment, a mouth 15 of this length encompasses about 60 degrees of the circumference of outer surface 12. As outer hub 4 rotates around inner hub 5, one of the distribution ports 9 (referred to as 9' to distinguish it from the other distribution ports 9) will be brought into alignment with mouth 15. Compressed gas will flow from tank 1 through inlet port 13 to this particular distribution port 9' and the associated air line 8 and drum 7 as long as distribution port 9' is aligned with mouth 15. When distribution port 9' rotates out of alignment with mouth 15, gas flow to the drum 7 associated with distribution port 9' will cease.

The length or effective length of mouth 15 may be adjustable by, for example, providing a moveable cover (not shown) that blocks a portion of mouth 15, wherein the portion blocked may range from 0% up to almost all of the mouth 15 or even all of mouth 15 if one of the uses of the cover is to entirely stop gas flow to drums 7.

Drums 7 on wheel 3 are radially aligned with outer surface 12 of inner hub 5. Thus, it will be appreciated that if wheel 3 is to be rotated in a clock-wise fashion, by positioning mouth 15 in the lower, left hand quadrant of outer surface 12, compressed gas may be preferably directed to drums 7 only when they are between the 6 and 9 o'clock positions on the wheel 3—that is near the bottom of wheel 3 on its rising half during its rotation or, stated differently, in the bottom half of the rising half of wheel 3.

In a preferred embodiment, drums 7 are generally oblong in shape, with a nose section 16 and a tail section 17. Nose section 16 is the front or leading end of drum 7 when wheel 3 is rotated. Tail section 17 is the opposite or trailing end of drum 7. Nose section 16 and tail section 17 are preferably both open and provide substantially unrestricted fluid access to the interior 26 of drum 7. Drums 7 are preferably substantially air tight, except for openings 27, 28 in nose 16 and tail 17 and the fluid connection between drums 7 and air lines 8. Drums 7 may be made of fiberglass or preferably of a hard, durable plastic such as High Density Polyethylene (HDPE) having a density of about 0.93-0.97 g/cm$^3$. Ideally, drums 7 are made of a tough, resilient material having a density close to that of the liquid in chamber 23, discussed below. Where that liquid is water, using a plastic having a density close (+/−10%) to that of water (1 gm/cm$^3$) will allow drums 7 to have nearly neutral buoyancy when filled with water. Having drums 7 be buoyantly neutral when not filled with gas will minimize the resistance drums 7 apply to wheel 3 when drums 7 are on the falling half of wheel 3.

A moveable plug 18 is positioned at the nose section 16 of each drum 7, proximate opening 27. Moveable plug 18 is preferably a ball valve 19 made of a ball 20 that is preferably made of a slightly buoyant to buoyantly neutral material such as vinyl or HDPE. Ball 20 is sized to prevent ball from passing through opening 27 in nose 16. However, ball 20 is further sized to substantially close opening 27 in nose 16 when ball 20 is positioned in opening 27. This is the closed position 21 of ball valve 19. A track 22 is preferably provided to keep ball 20 on a path between closed position 21 wherein the ball is positioned in opening 27 and an open position 80 wherein ball 20 is not in opening 27.

A chamber 23 is provided. Chamber 23 is at least partially filled with a liquid, preferably water. Anti-bacterial and anti-corrosive agents may be added to chamber 23, as needed. Windows 65 may be provided in chamber 23 to allow visual inspection of a wheel 3 positioned within chamber 23. As compressed gas is provided to a drum 7 positioned between the 6 o'clock position and the 9 o'clock position on wheel 3 (assuming clockwise rotation), the compressed gas will force ball valve 19 into closed position 21. If ball 20 is buoyant, the buoyancy will facilitate the movement of ball valve 19 into closed position 21 on the rising half of wheel 3. Once ball valve 19 is in closed position 21, continued introduction of compressed gas into drum 7 will force the liquid in drum 7 out of drum 7 via opening 28 in tail end 17.

When the liquid that was previously within drum 7 is displaced, drum 7 should be positioned below the surface 24 of the liquid in chamber 23. Creating a void space within drum 7 will cause drum 7 to exert a buoyant force on wheel 3. This force may be calculated according to the well known formula for buoyancy, $F_B = \rho V g = mg$, where $F_B$ is the buoyant force; $\rho$ is the density of the fluid in which the object is submerged—usually water; V is the volume of the fluid displaced by the object—here, the volume occupied by the drum 7; m is the mass of the displaced fluid—usually water; and g is the acceleration of gravity. Where the volume of the drum x acceleration of gravity x the density of the displaced fluid (usu. water) is greater than the force of gravity on the drum ($F_g$=mass of drum+mass of contents of the drum (gas)×acceleration of gravity), the drum will have a net positive buoyancy ($F_B > F_g$). As drum 7 attempts to rise within chamber 23, drum 7 will exert a force on wheel 3 causing wheel 3 to rotate within chamber 23.

Once wheel 3 rotates enough to take the distribution port 9' associated with drum 7 out of alignment with mouth 15, compressed gas will cease being provided to drum 7. When the distribution port 9 associated with the next drum 7 becomes aligned with mouth 15, compressed gas will be supplied to the next drum 7. In the preferred embodiment, compressed gas is not provided to drums 7 outside of the 6 to 9 o'clock window discussed above. It will be appreciated that the ideal amount of compressed gas introduced into each drum 7 will be enough to displace all of the liquid from drum 7 and no more. Any additional gas introduced into drum 7 will be largely wasted and will represent an inefficiency.

When opening 28 in tail end 17 of drum 7 breaks the surface 24 of the liquid in chamber 23, the gas in drum 7 will be vented within chamber 23. As wheel 3 rotates to the point where drum 7 is re-entering the liquid in chamber 23, the buoyancy (if any) of ball 20 will cause ball 20 move away from opening 27 in nose end 16 of drum 7 as will the force of ball 20/drum 7 impacting surface 24. This will allow liquid to enter drum 7, ideally flooding drum 7 completely before tail end 17 is submerged below surface 24. This will allow drums 7 to move through chamber 23 with a minimum of resistance.

Minimizing the resistance experienced by drums 7 and wheel 3 as they move through the liquid in chamber 23 is important to maximizing the efficiency of generator 2. To this end, chamber 23 will preferably closely match the size and dimensions of wheel 3, including drums 7, particularly near the bottom of chamber 23, so that there is minimal opportunity for turbulence in the liquid in chamber 23 to build up within chamber 23.

In a preferred embodiment, drum 7 is designed with the minimization of drag and resistance in mind. In one embodiment, drum 7 has a central section 25, between nose 16 and tail 17. In the preferred embodiment, nose 16 is preferably rounded. The external curvature of nose 16 and ball 20 are preferably selected to effect a smooth and substantially continuous curvature across nose section 16 when ball 20 is in closed position 21 so as to minimize the resistance to drum 7 moving through the liquid in chamber 23.

In the preferred embodiment, tail 17 is preferably provided with a tapered boat-tail configuration 81, so as to minimize the drag generated by drum 7 as it moves through the liquid in chamber 23.

Track 22 is preferably sized to allow ball 20 to be well removed from opening 27 in nose 16 when ball 20 is in open position 80. By moving ball 20 well away from opening 27 and positioning ball 20 in the largest part of interior 26, the least amount of drag and turbulence will be created as liquid moves through opening 27, around ball 20 and between ball 20 and the walls 29 of drum 7 and out opening 28.

In a preferred embodiment central section 25 is preferably cylindrical and is preferably provided with a smooth exterior. Similarly, nose section 16, tail section 17, and ball 20 are all preferably provided with smooth exteriors. Additionally, nose section 16, central section 25, and tail section 17 preferably blend smoothly and seamlessly into each other so as to minimize the drag created by the movement of drum 7 through the liquid in chamber 23.

As should be apparent from the foregoing, submersion or partial submersion of wheel 3 in liquid containing chamber 23 and selective introduction of compressed gas into drum(s) 7 positioned on or near rim 60 of wheel 3 will cause wheel 3 to rotate. In a preferred embodiment, wheel 3 is connected to a drive shaft 30 which powers a magnetic generator 70. As discussed above, in one preferred embodiment, the rotation of wheel 3 causes outer hub 4 to rotate about inner hub 5. In this configuration, outer hub 4 is connected to drive shaft 30 so that rotation of wheel 3 effects rotation of drive shaft 30 via outer hub 4. One option for the connection between drive shaft 30 and hub 5 is a geared connection, such as a planetary gear (not shown), in which the ring gear is driven by outer hub 5 and the sun gear drives drive shaft 30. By appropriately sizing the gear components, a constant rate of rotation of wheel 3 can be converted into a desired and constant rate of rotation of magnetic generator 70. Similarly, by varying the size of the gear components, a varying rate of rotation of wheel 3 can be converted into a desired and constant rate of rotation of magnetic generator 70.

In one respect, use of wheel 3 to drive magnetic generator 70 is similar to the use of windmills to drive generators. A low speed, high torque rotation is effected by both wheel 3 and a windmill. There are numerous ways to translate the low speed, high torque rotation generated by a windmill into the constant, high speed rotation preferable for a generator. Such mechanisms are known to those of skill in the art, as evidenced by works such as *Advances in Wind Power*, (2012). Carriveau, R., (Ed.). Croatia: IntechOpen (ISBN 9535108638, 9789535108634), which is hereby incorporated by reference in its entirety. Similar mechanisms may be used to translate the low speed, high torque rotations generated by wheel 3 into a constant, high speed rate of rotation of generator 70. However, it is noted that one advantage of wheel 3 is that its rate of rotation can be regulated to be constant, whereas those generating power from windmills must deal with the varying rates of rotation that arise from changes in wind speed.

In one embodiment, a passage 32 is provided through inner hub 5. Drive shaft 30 is preferably co-axially positioned relative to outer hub 4 and inner hub 5. Drive shaft 30 is operatively connected to outer hub 4, either through direct connection, via a gear box 31, or through other conventional mechanical connection. In this embodiment, drive shaft 30 is positioned in passage 32. It will be appreciated that passage 32 allows drive shaft 30 to extend through inner hub 5, which will facilitate positioning drive shaft 30 and magnetic generator 70 on either side of wheel 3.

In operation, a windmill 91, turbine 92, or other power source 93 is used to run a compressor 90 to fill a tank 1 with compressed gas that is preferably air. Tank 1 is then fluidly connected to generator 2, preferably with a compressed gas line 98. In other embodiments, generator 2 is used with other sources of compressed gas 95. For example, where natural (or other hydrocarbon) gases are being flared—that is released into the atmosphere, typically after burning—the hydrocarbon gases may be used to feed drums 7 of wheel 3/generator 2 before being flared.

Another source of compressed gas 95 is compressed natural gas pipelines. These pipelines are typically run at between 700-1100 psi. Over the length of the pipeline, pressure is lost. Accordingly, gas pipelines include compression stations at intervals along the course of the pipeline where the gas is re-pressurized. Each one of these compression stations provides an opportunity to use the gas to drive wheel 3/generator 2. Some of the gas may be bled off from the pipeline and used to power wheel 3/generator 2. This gas may be returned to the pipeline ahead of the compression station and returned to the pipeline at operational pressures with the rest of the gas on the downstream side of the compression station.

Another source of compressed gas 95 is industrial settings having pneumatic systems. In these systems, once air has been used to used to operate motors, pistons, and other equipment within the system, the air is often vented to the atmosphere when it is desired to restore the equipment to its original or starting state. Instead of venting such spent pneumatic air to the atmosphere, the spent air may be vented through drums 7 to drive generator 2.

It will be appreciated that any gases vented through drums 7 must be released from chamber 23. Otherwise, pressure will build up within chamber 23 and eventually inhibit or prevent the rotation of wheel 3. Where the gas is compressed air, the gas may be vented to the atmosphere. Chamber 23 may even be open. However, where the gas being used is hazardous, it should be captured and treated or disposed of in the same fashion that it would have been handled were it not being used in generator 2. For example, if the gas would have been burned if it were not being used in generator 2, the gas may be burned after exiting chamber 23.

Regardless of the source, compressed gas is introduced into drums 7, preferably when drums 7 are in the lower portion of the rising half of wheel 3's rotation path through the liquid in chamber 23. Introducing compressed gas to drums 7 will seat ball 20 in closed position 21, closing off nose section 16 of drum 7. Compressed gas will also displace liquid from interior 26 of drum 7. Displacing the liquid in drums 7 on the rising side of wheel 3 will make drums 7 on the rising side of wheel 3 more buoyant than the liquid filled drums 7 on the opposite, falling side of wheel 3. This difference in buoyancy will impart rotation to wheel 3. As wheel 3 rotates, it will turn drive shaft 30 which will power magnetic generator 70. As used herein magnetic generator 70 is a component of generator 2. Generator 70 will preferably be a conventional induction generator in which a rotor is rotated within a stator to induce an electrical current. Generator 70 will include a magnet which may be a permanent magnet or an electromagnet. Generators with electromagnets are often distinguished from generators with permanent magnets in the literature. Applicant is using the term "magnetic" herein to encompass generators that use electromagnets, permanent magnets, and combinations of the two. Electric current produced by magnetic generator 70 may be introduced via cable 99 to the grid for general power consumption, used to charge the batteries of electrical vehicles or to charge other conventional batteries, used to operate any conventional electrical equipment, or put to any other conventional electrical purpose.

EXAMPLE

A gas source has been used to provide wheel element of a buoyancy powered generator with 112 to 208 cubic feet per minute of compressed air (4-5 psi) at ambient temperature. The wheel had 8 fiberglass drums attached to the rim of the wheel. The wheel was 94 inches in diameter, as measured from the outside edge of one drum, across the wheel, to the outside edge of the opposite drum. Each drum had an internal volume of approximately 1.4 cubic feet. The wheel was contained within a water filled chamber and the compressed gas was delivered to the drums in the manner described in the application. Between 9-15 rotations per minute of the wheel were obtained. Torque was measured with an Interface™ torque transducer (model 5411-10K, purchased in 2021) and found to range between 781 and 1380 foot pounds (ft/lbs) with the wheel in motion. Resistance was applied to the wheel until rotation was stopped to measure continuous stall torque which was found to be 586 ft/lbs.

In horsepower (hp), assuming a median rpm of 12, the above torque numbers translate to between 1.8 and 3.2 horsepower (hp=torque×rpm/5252). One horsepower translates to about 0.75 Kw. Thus, these numbers translate into an output of between about 1.35 and 2.4 Kw. Of course, higher rpm's will be required to drive most magnetic generators. However, by using a properly configured transmission between the wheel and the drive shaft and/or between the drive shaft and the magnetic generator, a substantial rate of rotation of the rotor should be achievable. Rates of rotation from 1 and 2 hp motors regularly exceed 1000 rpm's, so a high rate of rotation should be achievable with the torque observed in the test wheel. Rotors are typically very well balanced. Starting them from a dead stop and accelerating the rotor takes far more power than does maintaining the rotors at a constant rate of revolution. Thus, it is anticipated that the buoyancy driven wheel could be used at high torque, low rpm's to start the rotor of the magnetic generator and, by moving through the gears of the transmission, increase the speed of the rotor to an operational speed while decreasing the torque.

Although the preferred embodiment has been described, those skilled in the art to which the present invention pertains will appreciate that modifications, changes, and improvements may be made without departing from the spirit of the invention defined by the following claims.

We claim:

1. A buoyancy powered electrical generator comprising a source of compressed gas;
a chamber containing a liquid having a liquid level within said chamber;
a wheel comprising a hub and a plurality of drums radially disposed about said hub and mechanically connected to said wheel, wherein each drum comprises a substantially hollow body having a nose opposite a tail and an interior positioned within said hollow body; a first aperture positioned in the nose and a second aperture in the tail, wherein the first and second apertures provide fluid passage to said interior of said body; a valve positioned proximate said first aperture, said valve having an open position wherein said first aperture is open and closed position wherein said first aperture is closed;
a plurality of gas distribution lines fluidly connecting said source of compressed gas to said plurality of drums; whereby gas may be selectively delivered to said drums;
wherein said wheel is positioned and configured to rotate within said chamber about a substantially horizontal axis, said wheel having a falling half and a rising half at any point during said rotation of said wheel, wherein said wheel is positioned in said chamber so that at least one of said plurality of drums on said falling half of said wheel is positioned below said liquid level and so that at least one of said plurality of drums on said rising half of said wheel is positioned below said liquid level;
wherein said plurality of drums are configured to allow each of said plurality of drums positioned on said falling half of said wheel to be filled with said liquid when said drums are submerged below said liquid level in said chamber when said wheel;
wherein said plurality of drums are each configured so that delivery of gas to a submerged one of said plurality of drums will move said valve into said closed position and evacuate said fluid from the interior of said submerged one of said plurality drums, whereby evacuating said fluid from the interior of said submerged one of said plurality of drums will generate a buoyant lift force which said drum will apply to said wheel on said rising half of said wheel, thereby imparting a rotational force to said wheel;
a magnetic generator having a rotor and a stator operatively connected to said wheel, whereby rotation of said wheel will effect rotation of said rotor.

2. The buoyancy powered electrical generator according to claim 1, wherein the source of compressed gas is a tank.

3. The buoyancy powered electrical generator according to claim 2, wherein the tank contains compressed air.

4. The buoyancy powered electrical generator according to claim 1, wherein the source of compressed gas comprises methane.

5. The buoyancy powered electrical generator according to claim 1, wherein the liquid in the chamber comprises water.

6. The buoyancy powered electrical generator according to claim 1, wherein the valve positioned in each of said plurality of drums comprises a ball valve.

7. The buoyancy powered electrical generator according to claim 6, wherein the ball valve comprises a ball and a track positioned and configured to confine said between said closed position and said open position.

8. The buoyancy powered electrical generator according to claim 7, wherein the ball is sized and configured to partially extend from said first aperture when said ball is in said closed position.

9. The buoyancy powered electrical generator according to claim 8, wherein the nose has an external curvature and the ball has an external curvature and wherein the ball and the nose are configured so that their respective external curvatures meet to provide a substantially smooth and continuous curvature when the ball is in closed position.

10. The buoyancy powered electrical generator according to claim 9, wherein the tail has a boat-tail configuration.

11. The buoyancy powered electrical generator according to claim 1, wherein the wheel further comprises a plurality of spokes extending from the hub.

12. The buoyancy powered electrical generator according to claim 11, wherein one of said plurality of drums is positioned on one of said plurality of spokes distal from said hub.

13. The buoyancy powered electrical generator according to claim 11, wherein one of said plurality of gas distribution lines extends along each of said plurality of spokes, whereby each of said plurality of drums is fluidly connected via one of said plurality of gas distribution lines to said hub.

14. The buoyancy powered electrical generator according to claim 13, wherein said one of said plurality of gas distribution lines is positioned within each of said plurality of spokes.

15. The buoyancy powered electrical generator according to claim 13, wherein said gas distribution lines are configured to provide gas to said drums when said drums are positioned on the rising half of said wheel.

16. The buoyancy powered electrical generator according to claim 15, wherein said gas distribution lines are configured to provide gas to said drums when said drums are positioned in a bottom half of said rising half of said wheel.

17. The buoyancy powered electrical generator according to claim 15, wherein said hub comprises a stationary inner hub and an outer hub configured to rotate on said inner hub.

18. The buoyancy powered electrical generator according to claim 17, wherein said inner hub has an outer surface and said outer hub has a bearing surface, wherein said inner hub and said outer hub are positioned so that said bearing surface of said outer hub rests on the outer surface of the inner hub.

19. The buoyancy powered electrical generator according to claim 18, wherein said outer hub is provided with a plurality of distribution ports each of which provide fluid passage from said bearing surface through said outer hub and, wherein one of said plurality of distribution ports is fluidly connected to each of said plurality of gas lines.

20. The buoyancy powered electrical generator according to claim 19, wherein said inner hub is provided with an inlet port fluidly connected to said source of compressed gas, said inlet port having a mouth positioned in said outer surface of said inner hub, said mouth sized and positioned to successively align with each of said plurality of distribution ports in said outer hub as said outer hub rotates around said inner hub.

21. The buoyancy powered electrical generator according to claim 20, wherein the inner hub comprises a first and a second quadrant of the inner hub, comprising a first half of the inner hub, and a third and fourth quadrant, comprising a second half of the inner hub, wherein the first and second quadrants of the inner hub are aligned with the falling half of the wheel and wherein the third and fourth quadrants are aligned with the rising half of the wheel when the wheel is rotating, wherein the mouth of the inlet port is positioned in a quadrant of the inner hub selected from the group consisting of the third and fourth quadrant.

22. The buoyancy powered electrical generator according to claim 21, wherein the third quadrant of the inner hub is aligned with the lower half of the rising half of the wheel when the wheel is rotating and wherein the mouth of the inlet port is positioned in the third quadrant of the inner hub.

23. The buoyancy powered electrical generator according to claim 1, further comprising a drive shaft operatively connecting said wheel and said generator, wherein rotation of said wheel causes said drive shaft to rotate and wherein rotation of said drive shaft causes said rotor to rotate.

24. A method of generating electricity using a buoyancy powered electrical generator comprising a source of compressed gas; a chamber containing a liquid having a liquid level within said chamber; a wheel comprising a hub and a plurality of drums radially disposed about said hub and mechanically connected to said wheel, wherein each drum comprises a substantially hollow body having a nose opposite a tail and an interior positioned within said hollow body; a first aperture positioned in the nose and a second aperture in the tail, wherein the first and second apertures provide fluid passage to said interior of said body; a valve positioned proximate said first aperture, said valve having an open position wherein said first aperture is open and closed position wherein said first aperture is closed; a plurality of gas distribution lines fluidly connecting said source of compressed gas to said plurality of drums; whereby gas may be selectively delivered to said drums; wherein said wheel is positioned and configured to rotate within said chamber about a substantially horizontal axis, said wheel having a falling half and a rising half at any point during said rotation of said wheel, wherein said wheel is positioned in said chamber so that at least one of said plurality of drums on said falling half of said wheel is positioned below said liquid level and so that at least one of said plurality of drums on said rising half of said wheel is positioned below said liquid level; wherein said plurality of drums are configured to allow each of said plurality of drums positioned on said falling half of said wheel to be filled with said liquid when said drums are submerged below said liquid level in said chamber when said wheel; wherein said plurality of drums are each configured so that delivery of gas to a submerged one of said plurality of drums will move said valve into said closed position and evacuate said fluid from the interior of said submerged one of said plurality drums, whereby evacuating said fluid from the interior of said submerged one of said plurality of drums will generate a buoyant lift force which said drum will apply to said wheel on said rising half of said wheel, thereby imparting a rotational force to said wheel; and a magnetic generator having a rotor and a stator and a drive shaft operatively connected to said wheel and said rotor, wherein the method comprises:

applying a rotational force to said wheel by introducing compressed gas from said source of compressed gas, via said plurality of gas distribution lines, to successive ones of said plurality of drums when each of said plurality of drums is in the rising half of said wheel, whereby said wheel may be rotated;

using the rotation of said wheel to turn the drive shaft and the rotor within said magnetic generator, to generate electricity.

25. The method of generating electricity using a buoyancy powered electrical generator according to claim 24, wherein the source of compressed gas is a tank.

26. The method of generating electricity using a buoyancy powered electrical generator according to claim 25, further comprising filling the tank with compressed gas using a compressor.

27. The method of generating electricity using a buoyancy powered electrical generator according to claim 26, wherein the step of filling the tank with compressed gas using a compressor is performed at a location remote from said wheel.

28. The method of generating electricity using a buoyancy powered electrical generator according to claim 27, further comprising transporting the tank from the location it was filled to a location proximate the wheel.

29. The method of generating electricity using a buoyancy powered electrical generator according to claim 28, wherein the location where the step of filling the tank with compressed gas is performed and the location where the step of applying rotational force to said wheel is performed are at least one mile apart.

30. The method of generating electricity using a buoyancy powered electrical generator according to claim 26, wherein the step of applying rotational force to said wheel is performed at least one hour after the step of filling the tank with compressed gas using a compressor.

31. The method of generating electricity using a buoyancy powered electrical generator according to claim 24, wherein said the step of introducing compressed gas from said source of compressed gas to successive ones of said plurality of drums is performed when said drums are positioned in a bottom half of said rising half of said wheel.

* * * * *